United States Patent
Ono et al.

(10) Patent No.: US 12,119,025 B2
(45) Date of Patent: Oct. 15, 2024

(54) IMAGE PROCESSING DEVICE, IMAGE PROCESSING METHOD, AND IMAGE PROCESSING PROGRAM

(71) Applicant: Nippon Telegraph and Telephone Corporation, Tokyo (JP)

(72) Inventors: Masato Ono, Musashino (JP); Takahide Hoshide, Musashino (JP); Yasushi Matsubara, Musashino (JP); Shinji Fukatsu, Musashino (JP); Kenichi Minami, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 150 days.

(21) Appl. No.: 17/599,065

(22) PCT Filed: Apr. 3, 2020

(86) PCT No.: PCT/JP2020/015299
§ 371 (c)(1),
(2) Date: Sep. 28, 2021

(87) PCT Pub. No.: WO2020/213430
PCT Pub. Date: Oct. 22, 2020

(65) Prior Publication Data
US 2022/0199120 A1 Jun. 23, 2022

(30) Foreign Application Priority Data
Apr. 18, 2019 (JP) .................................. 2019-079285

(51) Int. Cl.
*G11B 27/031* (2006.01)
*G06T 7/20* (2017.01)
(Continued)

(52) U.S. Cl.
CPC .............. *G11B 27/031* (2013.01); *G06T 7/20* (2013.01); *G06T 7/70* (2017.01); *G06V 10/16* (2022.01);
(Continued)

(58) Field of Classification Search
None
See application file for complete search history.

(56) References Cited

U.S. PATENT DOCUMENTS 10,917,565 B1 * 2/2021 Gilmour .............. H04N 13/106
11,341,614 B1 * 5/2022 Chen ..................... G06T 3/4038
(Continued)

FOREIGN PATENT DOCUMENTS

| JP | 2017102785 | 6/2017 |
| JP | 2017103672 | 6/2017 |
| JP | 2019036906 | 3/2019 |

OTHER PUBLICATIONS

Sato et al., "Surround Video Stitching and Synchronous Transmission Technology for Immersive Live Broadcasting of Entire Sports Venues," NTT Technical Review, 2020, 12 pages (with English translation).

*Primary Examiner* — Gelek W Topgyal
(74) *Attorney, Agent, or Firm* — Fish & Richardson P.C.

(57) ABSTRACT

To suppress an unnatural movement of a moving object at a connection point when a plurality of pieces of video data are connected to each other. A frame acquisition unit 22 acquires pieces of frame data captured at the same time, from the pieces of video data input from cameras C1 and C2. A prohibited-region setting unit 24 sets a prohibited region that is not set as a calculation target when a seam is calculated, based on a position of an object detected in an overlap region between adjacent pieces of frame data and a movement direction of the object. A seam calculation unit 25 calculates a seam between pieces of frame data adjacent to each other,
(Continued)

without setting a pixel included in the prohibited region as the calculation target of seam calculation. A connection-frame output unit 26 connects pieces of frame data in accordance with the seam and outputs connection frame data 15.

6 Claims, 13 Drawing Sheets

(51) Int. Cl.
*G06T 7/70* (2017.01)
*G06V 10/10* (2022.01)
*G06V 10/22* (2022.01)
*G06V 20/40* (2022.01)

(52) U.S. Cl.
CPC .............. *G06V 10/22* (2022.01); *G06V 20/41* (2022.01); *G06T 2207/10016* (2013.01)

(56) References Cited

U.S. PATENT DOCUMENTS

| | | | |
|---|---|---|---|
| 2016/0307350 A1* | 10/2016 | Huang | G06T 11/60 |
| 2017/0140791 A1* | 5/2017 | Das | H04N 23/698 |
| 2017/0178372 A1* | 6/2017 | Gormish | G06T 11/60 |
| 2018/0095533 A1 | 4/2018 | Song et al. | |
| 2019/0082103 A1* | 3/2019 | Banerjee | H04N 13/271 |

\* cited by examiner

IMAGE PROCESSING DEVICE, IMAGE PROCESSING METHOD, AND IMAGE PROCESSING PROGRAM

CROSS-REFERENCE TO RELATED APPLICATIONS

This application is a National Stage application under 35 U.S.C. § 371 of International Application No. PCT/JP2020/015299, having an International Filing Date of Apr. 3, 2020, which claims priority to Japanese Application Serial No. 2019-079285, filed on Apr. 18, 2019. The disclosure of the prior application is considered part of the disclosure of this application, and is incorporated in its entirety into this application.

TECHNICAL FIELD

The present invention relates to a technique for stitching a plurality of images captured by overlapping a portion of an image capturing region.

BACKGROUND ART

In Non Patent Literature 1, a surround image showing the entire state of a field game having a wide competition space is composited in such a manner that images captured by a plurality of cameras are stitched to each other in real time in horizontal and vertical directions. When images adjacent to each other are stitched to each other, a seam is set in an overlap region in which the adjacent images overlap each other. A composite image is obtained by cutting out and connecting adjacent images at the seam.

In Patent Literature 1, a prohibited region through which the seam does not pass is set in order to make the seam unnoticeable when a plurality of images are stitched to each other. For example, it is possible to avoid a defect or an elongation of the moving object, which occurs by overlapping the moving object with the seam, by setting a prohibited region for a moving object such as a person.

CITATION LIST

Patent Literature

Patent Literature 1: JP 2019-36906 A

Non Patent Literature

Non Patent Literature 1: Takako Sato, Koji Namba, Masato Ono, Yumi Kikuchi, Tetsuya Yamaguchi, and Akira Ono, "Surround Video Stitching and Synchronous Transmission Technology for Immersive Live Broadcasting of Entire Sports Venues", NTT Technical Journal, Nippon Telegraph and Telephone Corporation, 2017, Vol. 29, No. 10, pp. 19-23

SUMMARY OF THE INVENTION

Technical Problem

With movement of the moving object, the seam may change greatly to avoid the prohibited region set for the moving object. In this case, the moving object unfortunately appears to have moved unnaturally. For example, when a seam is set on the right side of a moving object in a frame but the seam is set on the left side of the moving object in the next frame, the moving object captured in the left image in the previous frame is used for a composited image, and a moving object captured in the right image in the next frame is used for a composited image. Due to the parallax between the first camera that captures the left image and the second camera that captures the right image, if the positions of the moving object on the left and right image are shifted from each other in the overlap region, the moving object appears to have moved suddenly, to have moved in a direction opposite to a traveling direction, or to be stopped.

The present invention has been made in view of the above circumstances, and an object of the present invention is to suppress an unnatural movement of a moving object at a connection point when a plurality of pieces of image data are connected to each other.

Means for Solving the Problem

According to an aspect of the present invention, there is provided an image processing device that stitches a plurality of pieces of image data obtained by capturing portions of an image capturing region with an overlap. The image processing device includes: a frame acquisition unit configured to acquire a plurality of pieces of frame data captured at the same time, from the plurality of pieces of image data; a prohibited-region setting unit configured to set a prohibited region through which a seam does not pass in an overlap region in which pieces of the plurality of pieces of frame data adjacent to each other overlap each other; a seam calculation unit configured to calculate the seam not to pass through the prohibited region; and a connection-frame output unit configured to connect the plurality of pieces of frame data to each other in accordance with the seam and output connection frame data obtained by the connection. The prohibited-region setting unit sets the prohibited region based on a position and a movement direction of an object when the object detected from the plurality of pieces of frame data enters into the overlap region.

According to an aspect of the present invention, there is provided an image processing method by an image processing device that stitches a plurality of pieces of image data obtained by capturing portions of an image capturing region with an overlap. The image processing method includes: acquiring a plurality of pieces of frame data captured at the same time, from the plurality of pieces of image data; setting a prohibited region through which a seam does not pass in an overlap region in which pieces of the plurality of pieces of frame data adjacent to each other overlap each other; calculating the seam not to pass through the prohibited region; and outputting connection frame data by connecting the plurality of pieces of frame data to each other in accordance with the seam. In setting the prohibited region, the prohibited region is set based on a position and a movement direction of an object when the object detected from the plurality of pieces of frame data enters into the overlap region.

According to an aspect of the present invention, there is provided an image processing program causing a computer to operate as units of the image processing device.

Effects of the Invention

According to the present invention, it is possible to suppress an unnatural movement of a moving object at a connection point when a plurality of pieces of image data are connected to each other.

DESCRIPTION OF EMBODIMENTS

Figure 1:
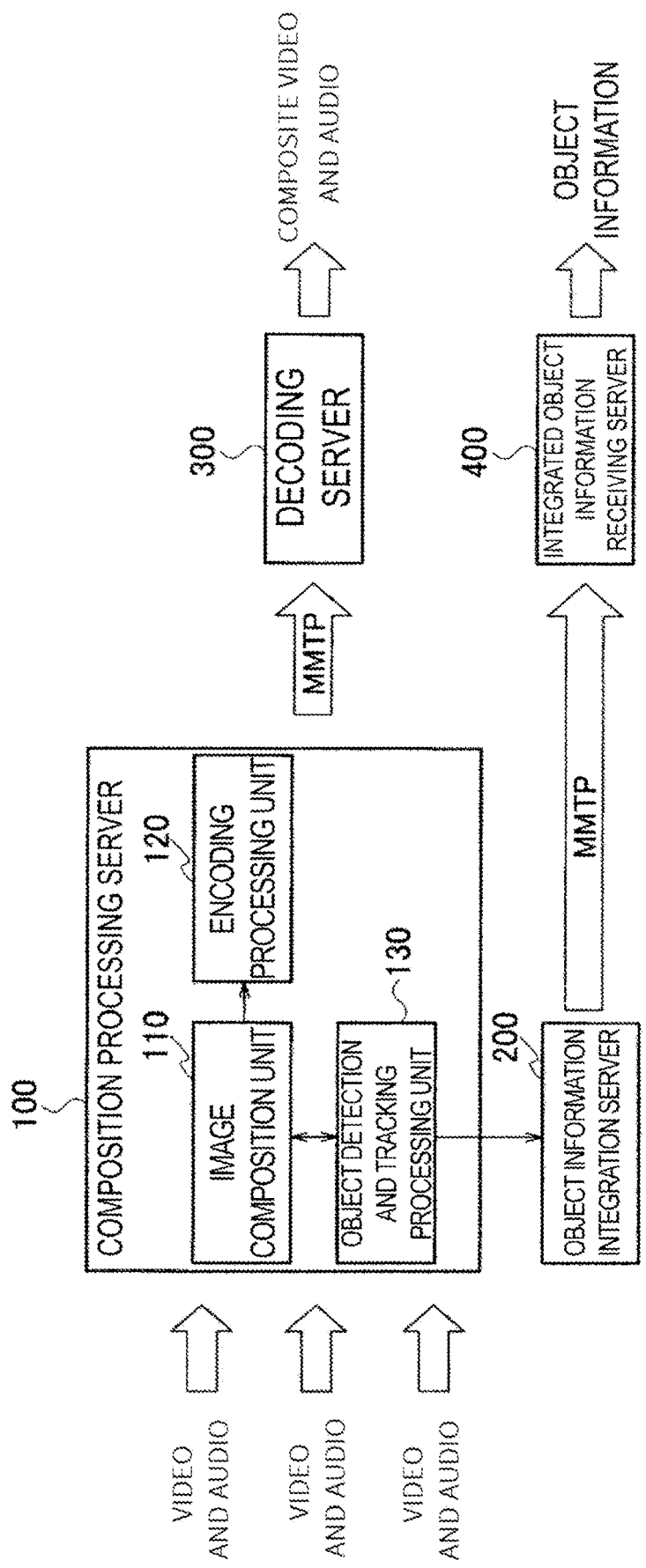
FIG. 1 is a diagram illustrating a configuration of a wide viewing-angle remote monitoring system configured using an video processing device according to an embodiment.

Hereinafter, an embodiment of the present invention will be described with reference to the drawings. In description of the drawings below, the same or similar component are designated by the same or similar reference signs.

A configuration of a wide viewing-angle remote monitoring system using video processing according to the present invention will be described with reference to FIG. 1. The wide viewing-angle remote monitoring system illustrated in the drawing is a system that realizes, with low latency, processing of composing a plurality of videos to generate a panoramic video, processing of acquiring object information of an object as a monitoring target from the video, and simultaneously transmitting the panoramic video, audio, and object information via an IP network using the MPEG media transport protocol (MMTP). A wide viewing-angle remote monitoring system can be used for monitoring at wide viewing angles, such as air traffic control, public space monitoring, and disaster prevention monitoring.

The wide viewing-angle remote monitoring system in FIG. 1 includes a composition processing server 100, an object information integration server 200, a decoding server 300, and an integrated object information receiving server 400.

The composition processing server 100 includes a composition processing unit 110, an encoding processing unit 120, and an object detection and tracking processing unit 130. The composition processing server 100 receives a video and audio from each of a plurality of imaging systems (for example, a 4 K camera) as inputs, composites a panoramic video by stitching videos, and performs detection and tracking of a target object from each video.

The composition processing unit 110 composites a panoramic video by stitching the plurality of input videos in real time. The composition processing unit 110 dynamically changes a seam that stitches the images. When obtaining the seam, the composition processing unit 110 uses video processing according to the present invention to improve the quality of the composition. The video processing uses tracking results of a moving object. Details of the video processing according to the present invention will be described later.

The encoding processing unit 120 encodes the composite panoramic video composed by the composition processing unit 110 and audio data, performs conversion into MMTP streams, and transmits the MMTP streams to the decoding server 300.

The object detection and tracking processing unit 130 detects and tracks a target object from each image. The object detection and tracking processing unit 130 transmits the result (tracking information) obtained by performing processing on each image, to the object information integration server 200 and the composition processing unit 110.

The object information integration server 200 converts the coordinates of the object on each video into coordinates on the panoramic video for the tracking information on each video input from the object detection and tracking processing unit 130. The object information integration server 200 integrates the tracking information of objects that appear in each video in an overlap region in which videos overlap each other when the objects are estimated to be the same. The object information integration server 200 converts object information in which additional information is added to the tracking information, into MMTP packets and then transmits the MMTP packets to the integrated object information receiving server 400. The additional information may be inquired and acquired for an external server.

The decoding server 300 decodes the MMTP stream received from the composition processing server 100 and outputs a panoramic video and audio.

The integrated object information receiving server 400 receives the MMTP packets of the object information from the object information integration server 200, and outputs the object information.

In a display system (for example, panoramic screen), the object information output from the integrated object information receiving server 400 is superimposed on the panoramic video output from the decoding server 300, and then the resultant of the superimposition is displayed.

(Configuration of Video Processing Device)

The configuration of the video processing device 1 according to the embodiment will be described with reference to FIG. 2. The video processing device 1 corresponds to the composition processing unit 110 in FIG. 1.

Figure 2:
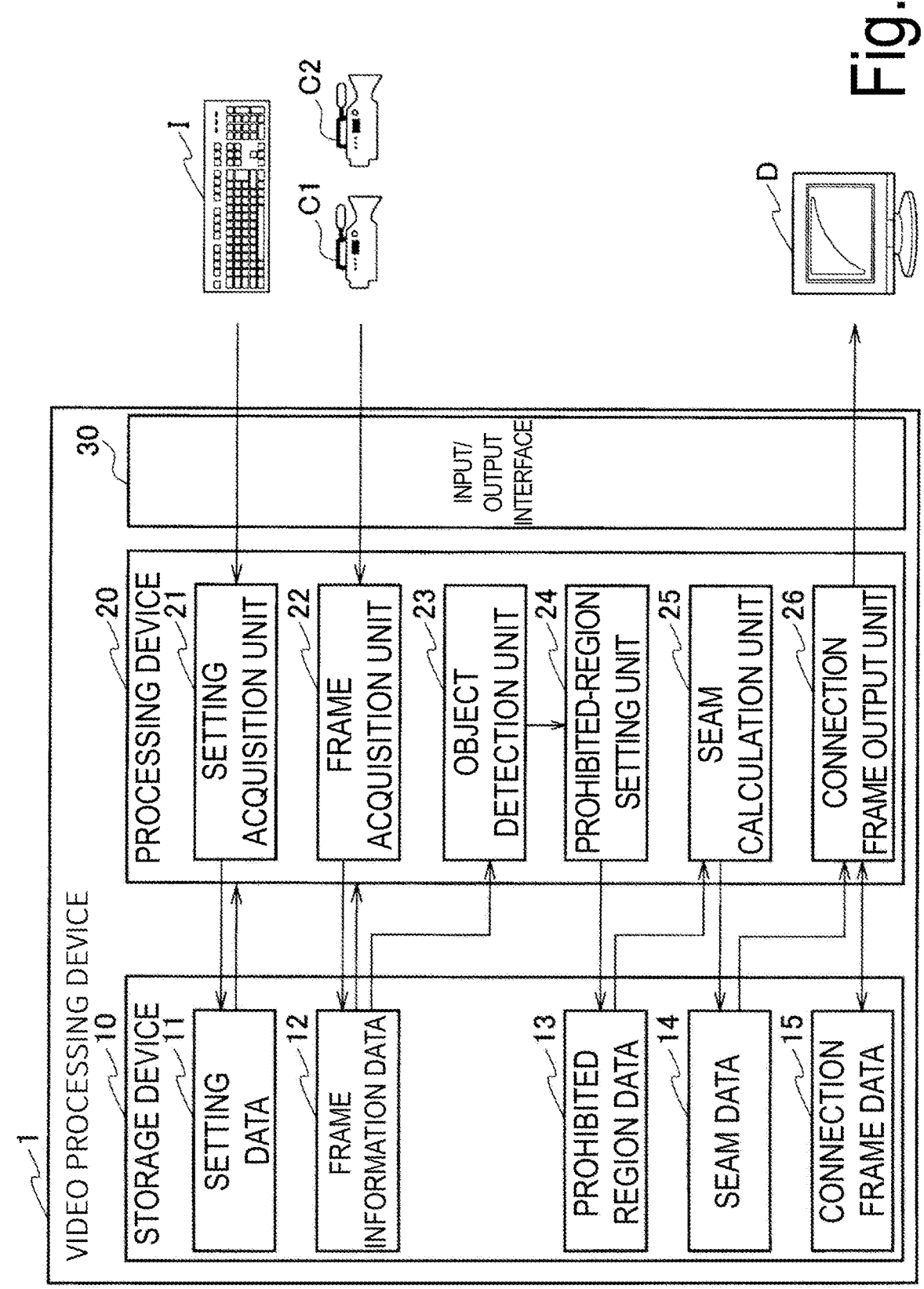
FIG. 2 is a diagram illustrating a hardware configuration and functional blocks of the video processing device according to the embodiment.

The video processing device 1 illustrated in FIG. 2 connects a plurality of pieces of video data obtained in such a manner that a plurality of cameras C1 and C2 capture videos of portions of a video capturing region to overlap each other, to generate one piece of video data, and then outputs the video data obtained by the connection to a display device D. The video processing device 1 searches for an appropriate seam in frame data captured at the same time in video data, and reconfigures video data by stitching pieces of frame data in accordance with the searched seams. In the embodiment, pieces of video data captured by the two cameras C1 and C2 that are horizontally arranged are composited. The embodiment is not limited thereto. Pieces of video data captured by three or more cameras may be composited. Pieces of video data captured by cameras that are arranged vertically may be composited. Pieces of video data captured by a plurality of cameras that are arranged horizontally and vertically may be composited.

The video processing device 1 illustrated in FIG. 2 is a general computer that includes a storage device 10, a processing device 20, and an input/output interface 30. The functions illustrated in FIG. 2 are implemented by the general computer executing an video processing program.

The storage device 10 is a read only memory (ROM), a random access memory (RAM), a hard disk, and the like and stores various kinds of data such as input data, output data, and intermediate data required for the processing device 20 executing processing.

The processing device 20 is a central processing unit (CPU) or a graphics processing unit (GPU). The processing device reads or writes data stored in the storage device 10 or inputs and outputs data to and from the input/output interface 30 to perform processing in the video processing device 1.

The input/output interface 30 receives an input from an input device I such as a keyboard and a mouse and the plurality of cameras C1 and C2, and inputs the input data to the processing device 20. The input/output interface 30 further outputs the processing results from the processing device 20 to the display device D such as a display. When transmitting the connection frame data of the processing result, the input/output interface 30 may transmit the encoded connection frame data via a network. The input device I, the plurality of cameras C1 and C2, and the display device D may be connected to the video processing device 1 via a communication interface and a communication network. Instead of the plurality of cameras C1 and C2, a recorder or a storage device that stores a plurality of pieces of captured data captured in advance may be connected to the video processing device 1, and the video processing device 1 may process the plurality of pieces of captured data captured in advance.

The storage device 10 stores setting data 11, frame information data 12, prohibited region data 13, seam data 14, and connection frame data 15. The storage device 10 may store the video processing program executed by the computer.

The setting data 11 refers to setting information such as parameters required for processing of the video processing device 1. The setting data 11 includes, for example, the number of pieces of video data to be input to the video processing device 1, the sequence of the video data, and a parameter used to calculate the prohibited region data 13.

The frame information data 12 refers to information of each piece of frame data captured at the same time in the plurality of pieces of video data output by the plurality of cameras C1 and C2. The frame information data 12 refers to data in which information such as an identifier of the camera, a pixel value, a frame rate, and a luminance value is associated with the frame data.

The prohibited region data 13 refers to data indicating a prohibited region that is not set as a calculation target during the seam calculation. The prohibited region is set by the prohibited-region setting unit 24 described later.

The seam data 14 refers to data of a result obtained in such a manner that the seam calculation unit 25 described later calculates the seam of the frame data.

The connection frame data 15 refers to connected frame data obtained by combining the plurality of frame data captured at the same time in accordance with the seam data 14. The connection frame data 15 refers to one piece of frame data forming the video data output by the video processing device 1.

The processing device 20 includes a setting acquisition unit 21, a frame acquisition unit 22, an object detection unit 23, a prohibited-region setting unit 24, a seam calculation unit 25, and a connection-frame output unit 26.

The setting acquisition unit 21 acquires parameters required for the processing of the video processing device 1 and stores the parameters in the setting data 11. The setting acquisition unit 21 acquires the parameters in accordance with the information input from the input device I by the user. The setting acquisition unit 21 may acquire the parameters by analyzing each piece of video data or the like input from the cameras C1 and C2.

The frame acquisition unit 22 acquires pieces of frame data captured at the same time, from the pieces of video data input from cameras C1 and C2. The frame acquisition unit 22 generates and stores frame information data 12 for each piece of acquired frame data. The frame acquisition unit 22 synchronizes pieces of video data when receiving an input of pieces of video data from the cameras C1 and C2, and compares timestamps of pieces of frame data. The frame acquisition unit 22 may perform correction processing and color correction processing in order to reduce an influence of parallax caused by image capturing by the plurality of cameras C1 and C2.

The object detection unit 23 corresponds to the object detection and tracking processing unit 130 in FIG. 1. The object detection unit 23 detects a target object from each piece of the frame data, and performs tracking of the detected object. Tracking means determination of the identity between an object detected in the current frame data and an object detected in the previous frame data and tracking of the movement of the object. The object as a detection target is, for example, a moving object such as a person, as a monitoring target.

The prohibited-region setting unit 24 sets a prohibited region based on the position of the object detected in an overlap region between adjacent pieces of frame data and the movement direction of the object. Similar to Patent Literature 1, the prohibited-region setting unit 24 may set the prohibited region based on the luminance value of the frame data. Details of a method of setting the prohibited region based on the detected object will be described later.

The seam calculation unit 25 acquires a plurality of pieces of frame data captured at the same time, and calculates the seam data 14 that indicates the seam between pieces of frame data adjacent to each other, in a state where a pixel included in the prohibited region indicated by the prohibited region data 13 is not set as the calculation target during the seam calculation. More specifically, the seam calculation unit 25 calculates a pixel having the smallest difference in feature value from a pixel of the seam calculated immediately before, among pixels in a search range for the adjacent line, as the seam in this line. At this time, the seam calculation unit 25 does not include the pixel included in the prohibited region, in the search range. The seam calculation unit 25 may calculate the seam by using reduced frame data obtained by reducing frame data. In this case, the seam calculation unit 25 reduces and applies the prohibited region.

The connection-frame output unit 26 connects a plurality of pieces of frame data in accordance with the seam data 14 calculated by the seam calculation unit 25, and outputs the connection frame data 15 in which pieces of frame data do not overlap each other.

(Operation of Video Processing Device)

Figure 3:
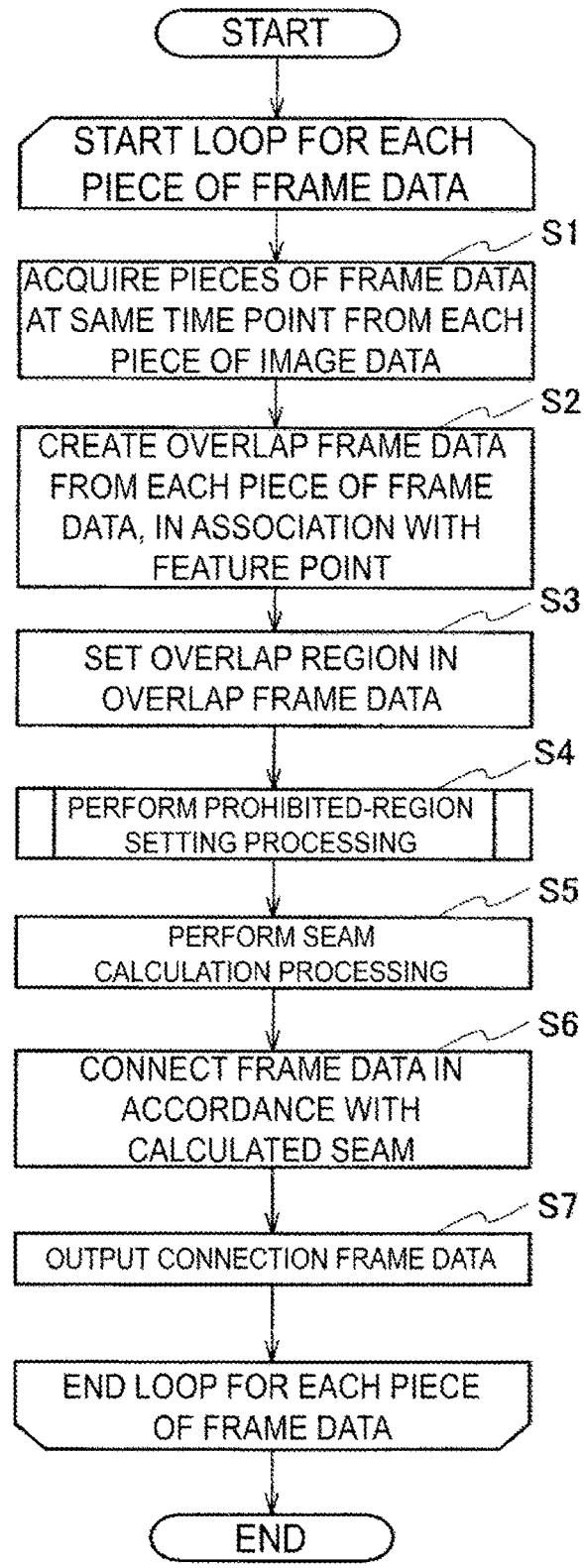
FIG. 3 is a flowchart illustrating a processing flow of the video processing device according to the embodiment.

Next, an video processing method by the video processing device 1 will be described with reference to FIG. 3. Regarding video data input from each of the cameras C1 and C2, the video processing device 1 repeats processes of the following steps S1 to S7 on pieces of frame data captured at the same time.

In Step S1, the frame acquisition unit 22 acquires pieces of frame data captured at the same time point, from the video data input from each of the cameras C1 and C2.

In Step S2, the frame acquisition unit 22 associates feature points of the frame data acquired in Step S1 to generate overlap frame data.

Figure 4:
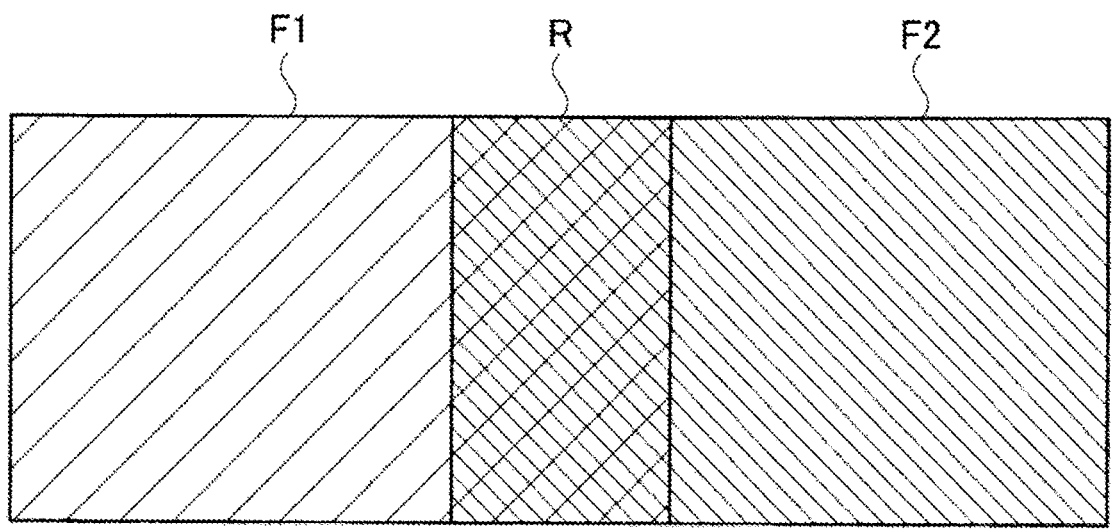
FIG. 4 is a diagram illustrating an example of overlap frame data.

FIG. 4 illustrates an example of overlap frame data. FIG. 4 illustrates overlap frame data generated from frame data F1 and F2 captured at the same time by the two cameras C1 and C2. The frame acquisition unit 22 overlaps the frame data F1 and F2 to generate overlap frame data such that the feature point of the frame data F1 on the right side of the image capturing region coincides with the feature point of the frame data F2 on the left side of the image capturing region. In FIG. 4, the pieces of frame data F1 and F2 overlap each other so that the overlap frame data is rectangular. However, if the roll angles of each of the cameras C1 and C2 are different from each other, the frame data may be disposed at an angle.

In Step S3, the frame acquisition unit 22 sets the overlap region in the overlap frame data generated in Step S2. In FIG. 4, a region in which the right side of the image capturing region in the frame data F1 overlaps the left side of the image capturing region in the frame data F2 is an overlap region R.

Figure 5:
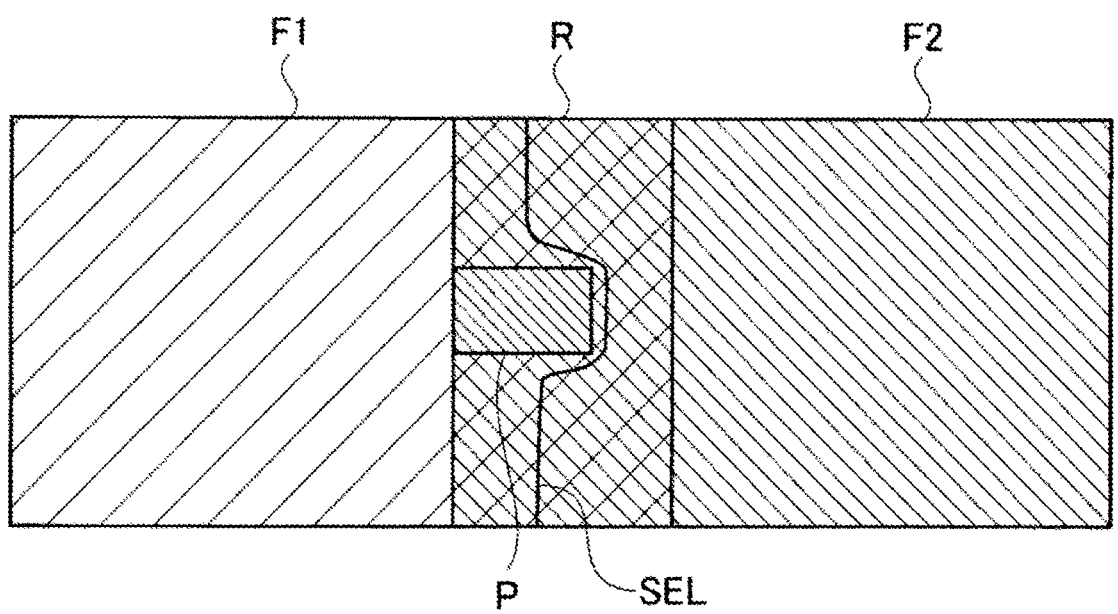
FIG. 5 is a diagram illustrating an example in which a prohibited region is set in an overlap region of overlap frame data.

In Step S4, the prohibited-region setting unit 24 sets a prohibited region based on an object detected from the frame data F1 and F2. FIG. 5 illustrates the prohibited region P. Details of processing of setting the prohibited region will be described later.

In Step S5, the seam calculation unit 25 does not set the pixel included in the prohibited region, as the calculation target during the seam calculation, and sequentially specifies a pixel forming a seam in a direction perpendicular to an adjacent direction of the frame data to calculate the seam. For example, in FIG. 5, the pieces of frame data F1 and F2 are horizontally adjacent to each other. Thus, the seam calculation unit 25 determines one pixel as a seam from the lateral line of the overlap region R without setting the pixel included in the prohibited region P as the calculation target during the seam calculation. Then, the seam calculation unit 25 calculates pixels forming the seam sequentially in a longitudinal direction to obtain a seam SEL.

Figure 6:
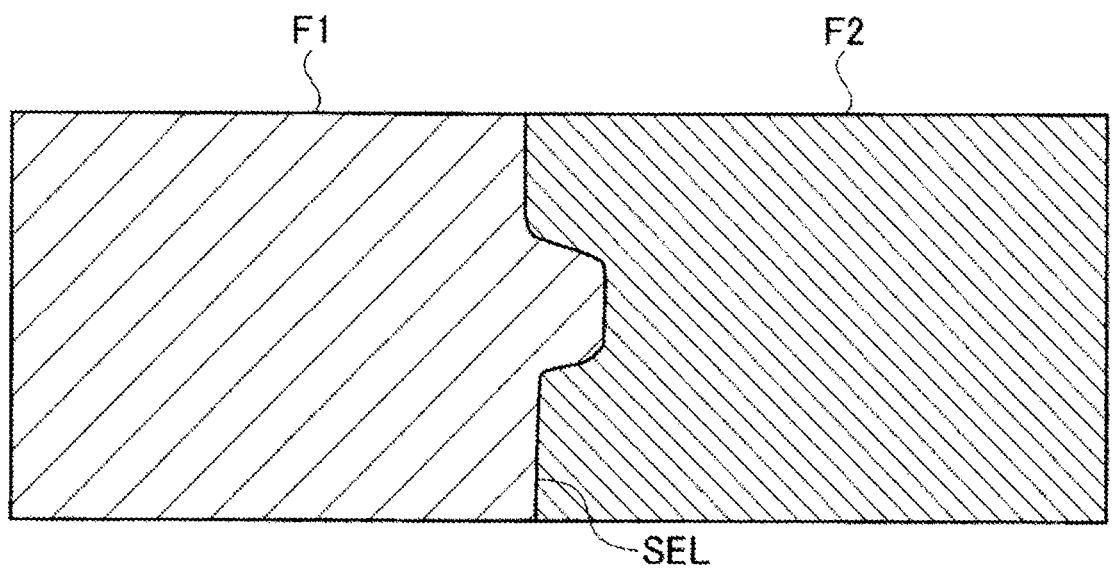
FIG. 6 is a diagram illustrating an example of connection frame data in which pieces of frame data are connected to each other in accordance with a seam.

In Step S6, the connection-frame output unit 26 connects pieces of frame data to each other in accordance with the seam to generate the connection frame data 15. FIG. 6 illustrates an example of the connection frame data in which pieces of frame data are connected to each other in accordance with the seam. In FIG. 6, the frame data F1 and the frame data F2 separated by the seam SEL are stitched together to generate the connection frame data.

In Step S7, the connection-frame output unit 26 outputs the connection frame data 15 generated in Step S6. The connection frame data 15 refers to frame data of video data output by the video processing device 1.

(Setting of Prohibited Region)

Figure 7:
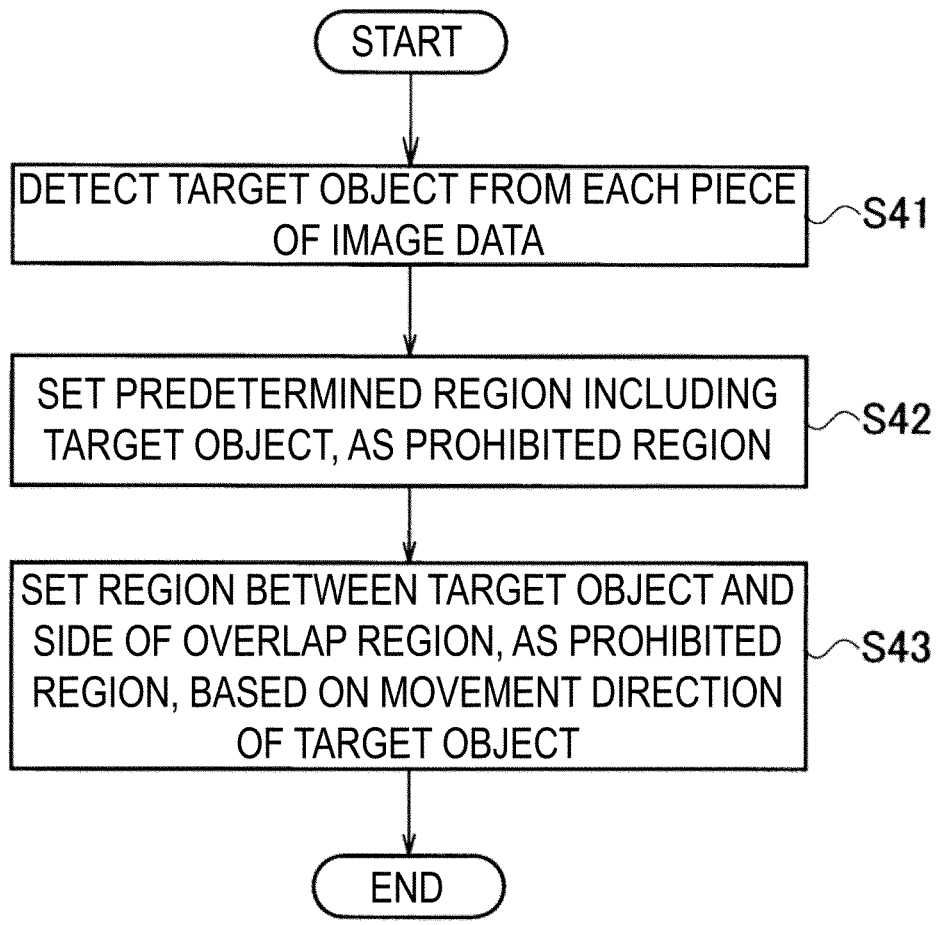
FIG. 7 is a flowchart illustrating a flow of processing for setting the prohibited region.

Next, setting processing of the prohibited region will be described with reference to FIG. 7.

In Step S41, the object detection unit 23 detects and tracks a target object for each piece of frame data. The prohibited-region setting unit 24 acquires position information and the movement direction of the object detected in the overlap region, on the frame data. The process of Step S41 may be performed before the prohibited region is set. For example, the frame data is acquired from each piece of the video data in Step S1, and then the process of Step S41 may be performed. Another apparatus may perform object detection and tracking, and the video processing device 1 may receive the detection result of the object.

Figure 8:
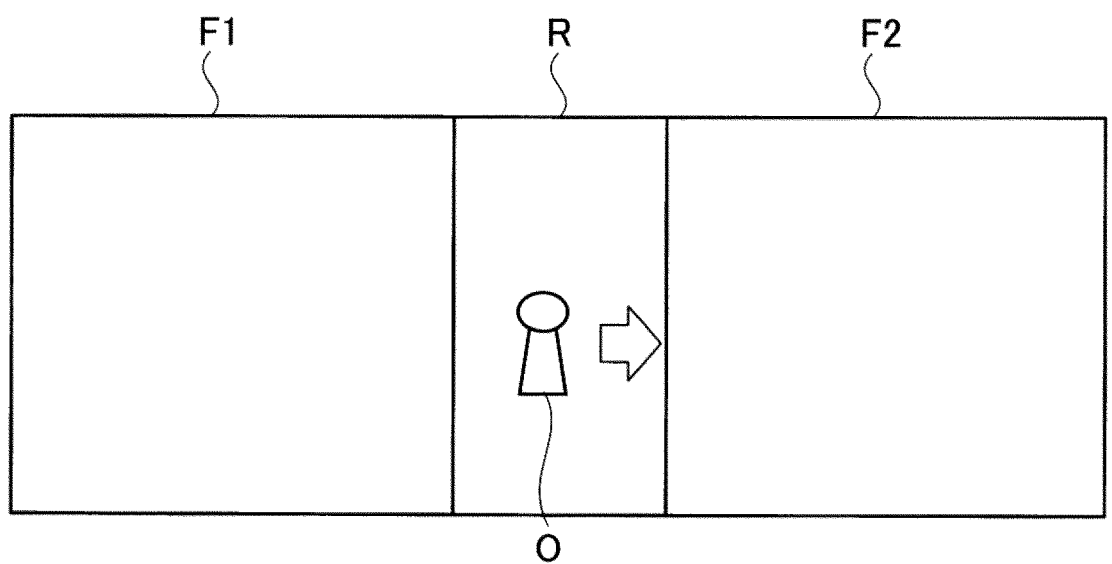
FIG. 8 is a diagram illustrating an example of an object detected in the overlap region.

FIG. 8 illustrates an object O detected in the overlap region R. The object O illustrated in FIG. 8 moves from the left side (frame data F1 side) to the right side (frame data F2 side) of the pieces of frame data F1 and F2 that are horizontally arranged.

The object detection unit 23 detects the same object O in the frame data F1 and F2 in the overlap region R. Due to the disparity of the cameras C1 and C2, the detected position of the object O in the frame data F1 may be shifted from the detected position of the object O in the frame data F2. Because the object O moves from the frame data F1 in a direction of the frame data F2, the object detection unit 23 may set the detected position of the object O in the frame data F1, as the position of the object O. The detected positions of the object in the frame data F1 and F2 may be converted into coordinates on the connection frame data, and may set the coordinates to be the position of the object O. In this case, even if the detected positions of the object O in the frame data F1 and F2 are slightly shifted from each other, the detected positions are set to the same coordinates so long as determination to be the same object is performed.

Figure 9:
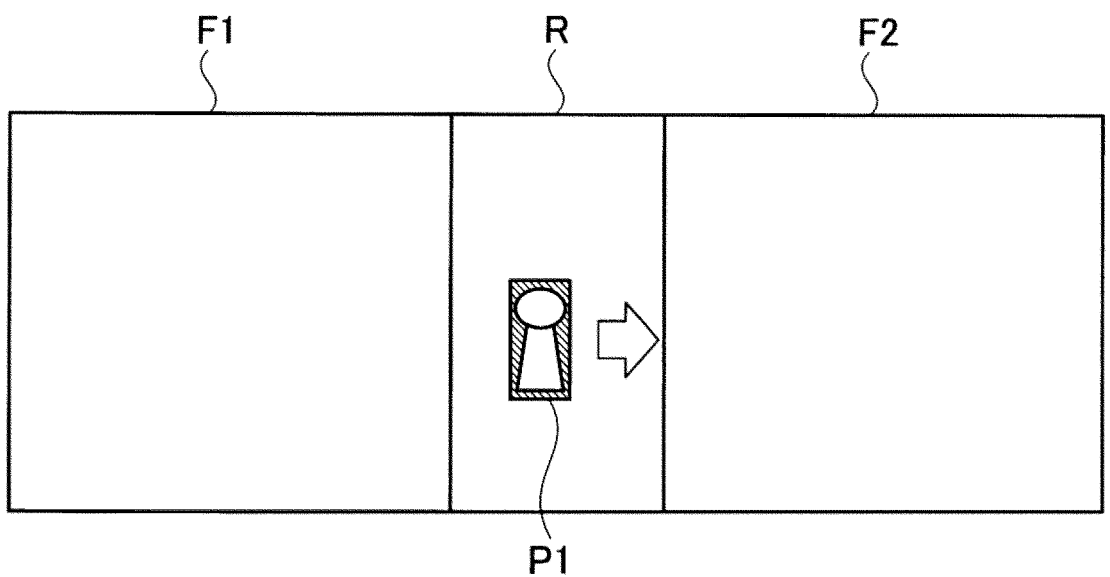
FIG. 9 is a diagram illustrating an example in which a predetermined region including the detected object is set as the prohibited region.

In Step S42, the prohibited-region setting unit 24 sets a predetermined region including the object detected in the overlap region, as the prohibited regions so that the seam is not generated across the object. FIG. 9 illustrates a state in which the region including the object O is set as the prohibited region P1. The prohibited-region setting unit 24 sets a prohibited region P1, for example, based on a detection frame for detecting the object O.

Figure 10:
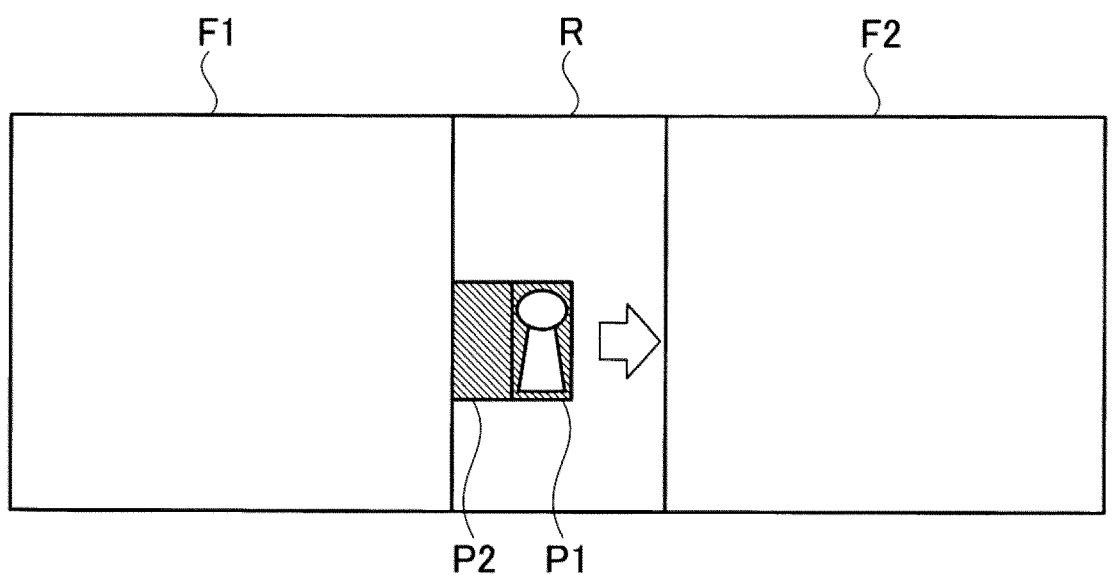
FIG. 10 is a diagram illustrating an example of setting the prohibited region based on a movement direction of the object.

In Step S43, the prohibited-region setting unit 24 sets a region between the prohibited region set in Step S42 and the side of the overlap region, as the prohibited region based on the parameter of the setting data 11 and the movement direction of the object. In the example of FIG. 10, the prohibited-region setting unit 24 sets the region from the prohibited region P1 to the side (side of the overlap region R on the left side) through which the object enters into the overlap region R, as a prohibited region P2. Based on the movement direction of the object, the prohibited-region setting unit 24 may set, as the prohibited region, a region from the prohibited region P1 to the side of the overlap region R on the entrance direction side of the object as illustrated in FIG. 10, or may set, as the prohibited region, a region from the prohibited region P1 to the side (side of the overlap region R on the right side in FIG. 9) on the traveling direction side of the object. Alternatively, the prohibited-region setting unit 24 may set only the prohibited region P1 as the prohibited region. The prohibited-region setting unit 24 may change the shape, the range, and the like of the prohibited region P2 set from the prohibited region P1 to the side of the overlap region R, based on the parameter of the setting data 11.

The prohibited-region setting unit 24 may further perform processing of setting the prohibited region in a portion where the luminance value of the frame data is higher than a predetermined threshold value. The threshold value and the like can be adjusted by the setting data 11. In some settings, the prohibited region may not be set based on the luminance value.

Figure 11:
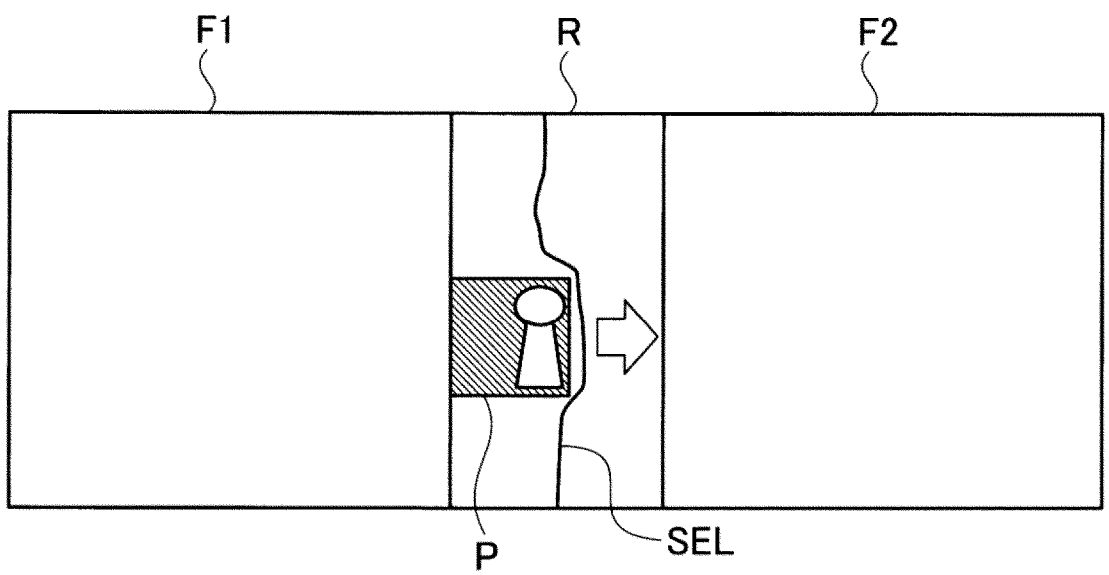
FIG. 11 is a diagram illustrating an example of obtaining a seam from the overlap frame data in FIG. 10.

As illustrated in FIG. 11, the seam calculation unit 25 obtains the seam SEL not to pass through the prohibited region P set based on the object.

Figure 12:
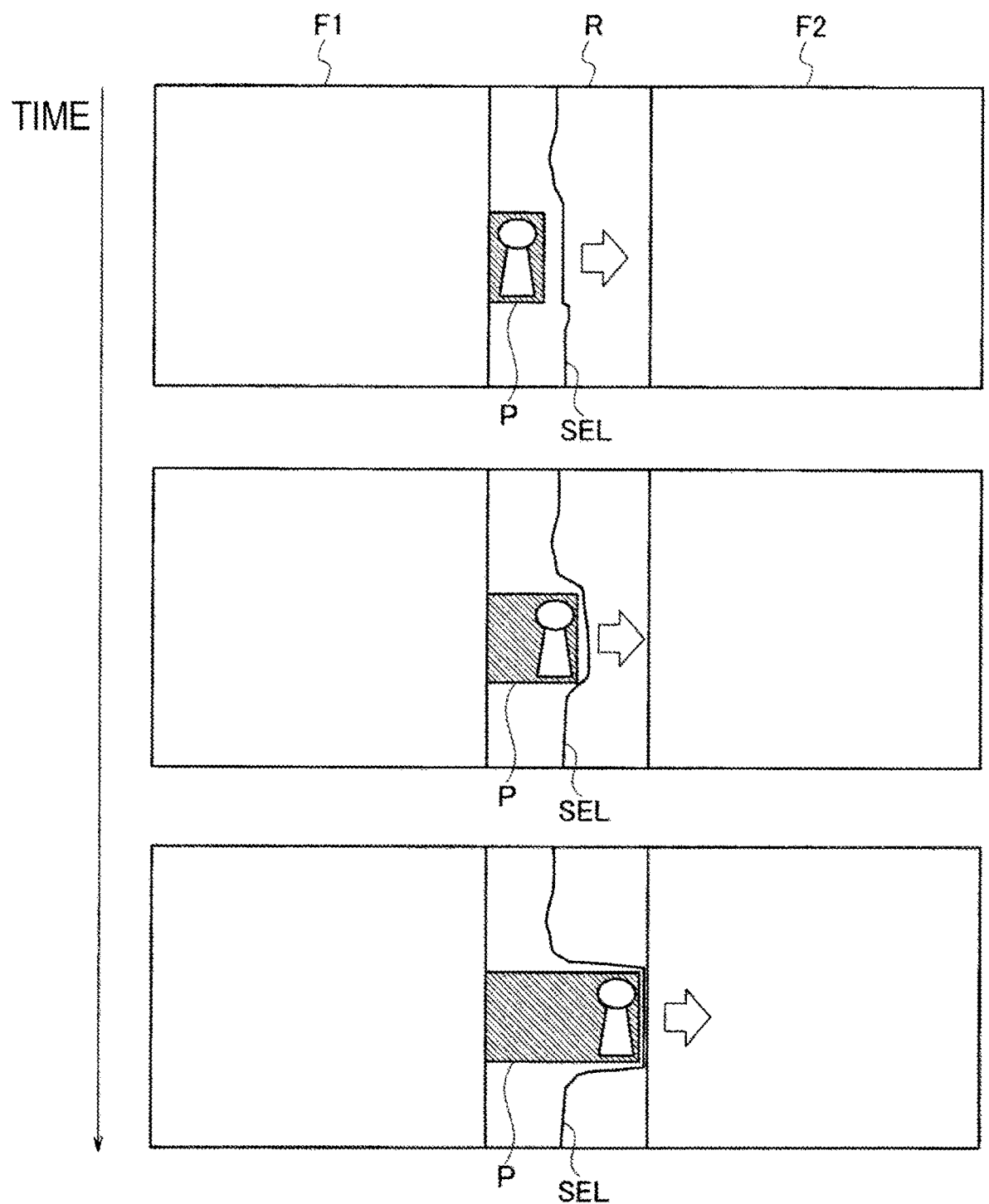
FIG. 12 is a diagram illustrating a change in chronological order between the prohibited region set on an entrance direction side of the object, and the seam.

With the processing of setting the prohibited region described above, as illustrated in FIG. 12, the prohibited region P is set as a region from the side through which the object enters into the overlap region R to the current position of the object during a period when the object advances the overlap region R. Then, the seam SEL passes through the traveling direction side of the object. As a result, the image of the object in the frame data F1 as an entrance source is used in the connection frame data while the object advances the overlap region R. Thus, even when the positions of the object in the frame data F1 and F2 in the overlap region R are shifted from each other, it is possible to suppress an unnatural movement of the object in the overlap region R in the composite image. At a timing at which the detected positions of the object on the frame data F1 and F2 in the overlap region R are substantially the same (within a predetermined range), the prohibited-region setting unit 24 may set a region from the current position of the object to the side of the overlap region R in the traveling direction, as the prohibited region P.

Figure 13:
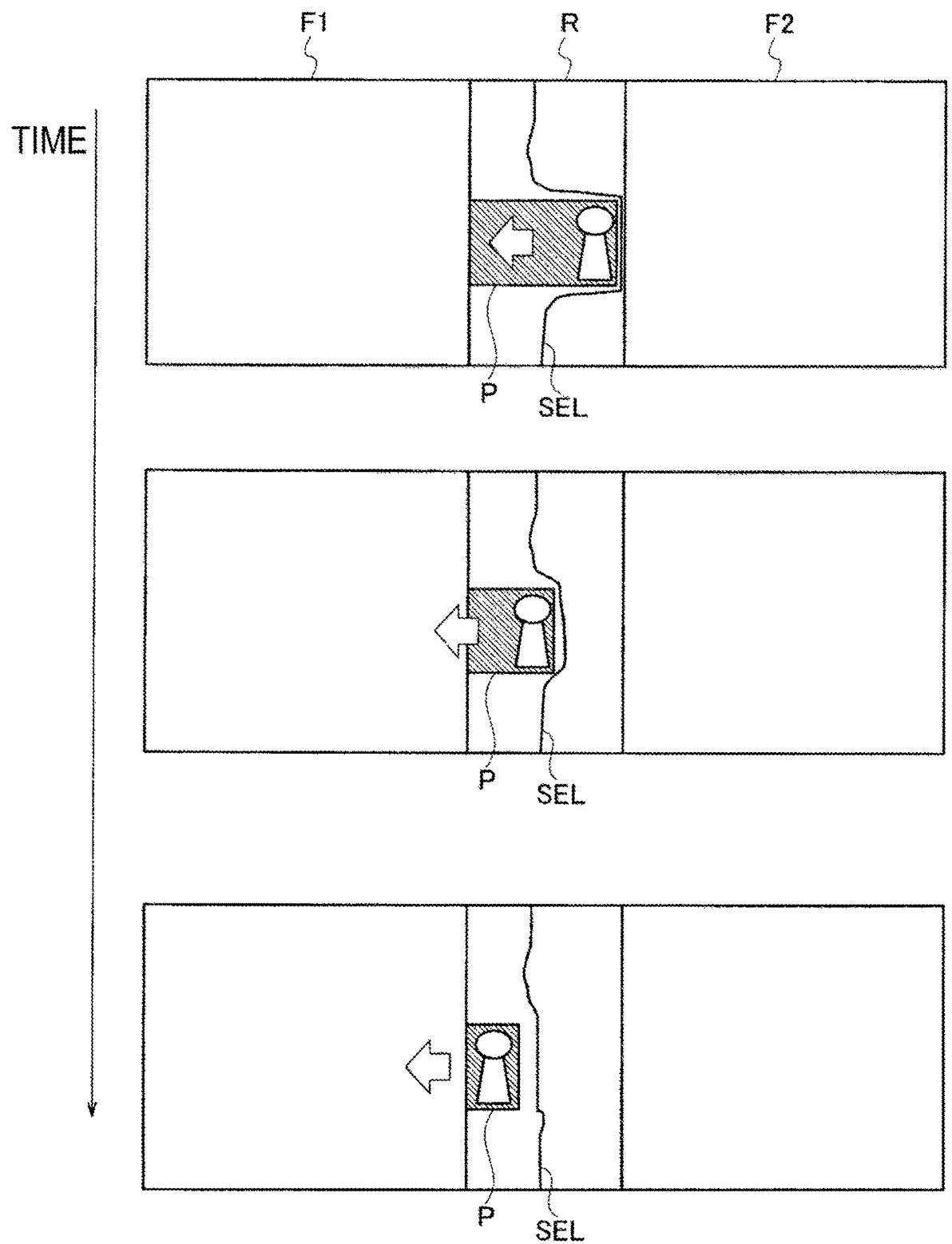
FIG. 13 is a diagram illustrating a change in the chronological order between the prohibited region set on a traveling direction side of the object, and the seam.

FIG. 13 is a diagram illustrating a state in which the prohibited region P is set on the traveling direction side of the object. In the example of FIG. 13, the object travels from the frame data F2 toward the frame data F1. In FIG. 13, the prohibited region P is set as a region from the current position of the object to the side of the overlap region R on the traveling direction side of the object, while the object advances the overlap region R. The seam SEL passes through the back side of the object.

If the plurality of objects enter into the overlap region, and the objects are directed in the same direction, the sum may be set as the prohibited region. For example, objects that move in the same direction are collectively handled and are set as the prohibited region. When the movement direction of the object varies, the prohibited region may be set based on the movement direction of each object. Alternatively, the prohibited region may be set by prioritizing objects.

As described above, according to the embodiment, the frame acquisition unit 22 acquires frame data captured at the same time, from video data input from the cameras C1 and C2. The prohibited-region setting unit 24 sets the prohibited region that is not set as the calculation target during the seam calculation, based on the position of the object detected in the overlap region of pieces of frame data adjacent to each other, and the movement direction of the object. The seam calculation unit 25 calculates the seam of pieces of frame data adjacent to each other without setting the pixel included in the prohibited region as the calculation target of the seam calculation. Then, the connection-frame output unit 26 connects frame data in accordance with the seam and outputs the connection frame data 15. In this manner, it is possible to suppress the rapid change of the seam and to suppress the unnatural movement of the object.

REFERENCE SIGNS LIST

1 Video processing device
10 Storage device
11 Setting data
12 Frame information data
13 Prohibited region data
14 Seam data
15 Connection frame data
20 Processing device
21 Setting acquisition unit
22 Frame acquisition unit
23 Object detection unit
24 Prohibited-region setting unit
25 Seam calculation unit
26 Connection-frame output unit
30 Input/output interface
100 Composition processing server
110 Composition processing unit
120 Encoding processing unit
130 Object detection and tracking processing unit
200 Object information integration server
300 Decoding server
400 Integrated object information receiving server

The invention claimed is:

1. An image processing device that stitches a plurality of pieces of image data obtained by capturing portions of an image capturing region with an overlap, the image processing device comprising:
a frame acquisition unit, including one or more processors, configured to acquire a plurality of pieces of frame data captured at the same time, from the plurality of pieces of image data;
an object detection unit, including one or more processors, configured to detect a target object in an overlap region in which pieces of the frame data adjacent to each other overlap each other;
a prohibited-region setting unit, including one or more processors, configured to set, in the overlap region, a prohibited region through which a seam does not pass;
a seam calculation unit, including one or more processors, configured to calculate the seam not to pass through the prohibited region; and
a connection-frame output unit, including one or more processors, configured to connect the plurality of pieces of frame data to each other in accordance with the seam and output connection frame data obtained by the connection,
wherein the prohibited-region setting unit is configured to: (i) determine, in the overlap region, a first region that encompasses the detected target object, (ii) determine a second region which spans from a side of the first region to a side of the overlap region on an entrance direction side of the target object, and (iii) set the prohibited region as including both of the first region and the second region.

2. The image processing device according to claim 1, wherein the prohibited-region setting unit is configured to set, as the prohibited region, a region from the position of the target object to a side of the overlap region on a traveling direction side of the target object after detected positions of the target object on the frame data in the overlap region are substantially the same.

3. An image processing method by an image processing device for stitching a plurality of pieces of image data obtained by capturing portions of an image capturing region with an overlap, the image processing method comprising:
acquiring a plurality of pieces of frame data captured at the same time, from the plurality of pieces of image data;
detecting a target object in an overlap region in which pieces of the frame data adjacent to each other overlap each other;

setting, in the overlap region, a prohibited region through which a seam does not pass; and outputting connection frame data by connecting the plurality of pieces of frame data to each other in accordance with the seam, wherein setting the prohibited region comprises: (i) determining, in the overlap region, a first region that encompasses the detected target object, (ii) determining a second region which spans from a side of the first region to a side of the overlap region on an entrance direction side of the target object, and (iii) setting the prohibited region as including both of the first region and the second region.

4. The image processing method according to claim 3, wherein, in setting the prohibited region, a region from the position of the target object to a side of the overlap region on a traveling direction side of the target object is set as the prohibited region after detected positions of the target object on the frame data in the overlap region are substantially the same.

5. A non-transitory computer readable storage medium having stored thereon an image processing program for causing one or more processors of an image processing device to perform an image processing method for stitching a plurality of pieces of image data obtained by capturing portions of an image capturing region with an overlap, the image processing method comprising:

acquiring a plurality of pieces of frame data captured at the same time, from the plurality of pieces of image data;

detecting a target object in an overlap region in which pieces of the frame data adjacent to each other overlap each other;

setting, in the overlap region, a prohibited region through which a seam does not pass; and outputting connection frame data by connecting the plurality of pieces of frame data to each other in accordance with the seam, wherein setting the prohibited region comprises: (i) determining, in the overlap region, a first region that encompasses the detected target object, (ii) determining a second region which spans from a side of the first region to a side of the overlap region on an entrance direction side of the target object, and (iii) setting the prohibited region as including both of the first region and the second region.

6. The non-transitory computer readable storage medium according to claim 5, wherein, in setting the prohibited region, a region from the position of the target object to a side of the overlap region on a traveling direction side of the target object is set as the prohibited region after detected positions of the target object on the frame data in the overlap region are substantially the same.

* * * * *